United States Patent [19]

Partin et al.

[11] Patent Number: 4,538,673

[45] Date of Patent: Sep. 3, 1985

[54] DRILLED WELL SERIES AND PARALLELED HEAT EXCHANGE SYSTEMS

[75] Inventors: James R. Partin; John P. Rawlings, both of Stillwater, Okla.

[73] Assignee: Geo-Systems, Inc., Stillwater, Okla.

[21] Appl. No.: 606,177

[22] Filed: May 2, 1984

[51] Int. Cl.³ .................. F28D 21/00; F25D 23/12
[52] U.S. Cl. ................................. 165/45; 62/260
[58] Field of Search ........... 62/260, 324.1; 165/45, 165/174, 177; 237/2 B; 137/583

[56] References Cited

U.S. PATENT DOCUMENTS

| | | | |
|---|---|---|---|
| 506,529 | 10/1893 | McHee | 62/260 X |
| 1,875,305 | 8/1932 | Hill | 62/260 |

FOREIGN PATENT DOCUMENTS 542788  2/1977  U.S.S.R. ................. 62/260

Primary Examiner—Henry Bennett
Attorney, Agent, or Firm—Head, Johnson & Stevenson

[57] ABSTRACT

A system for exchanging thermal energy between a fluid medium and the earth is provided employing a number of boreholes drilled vertically in the earth spaced apart by adjacent intervals. An upflow conduit and a downflow conduit are placed in parallel relationship within the boreholes and connected at their lower ends. At the top of each borehole there is a header providing means to conduct fluid through the conduits in each borehole in a parallel or series arrangement. In each of the headers there is a partition dividing the flow of fluid passing downwardly into the borehole from the flow of fluid passing upwardly out of the borehole with a vent in the partition so that air which might otherwise be trapped in the verical conduits can by vented to prevent airlock of the system.

16 Claims, 13 Drawing Figures

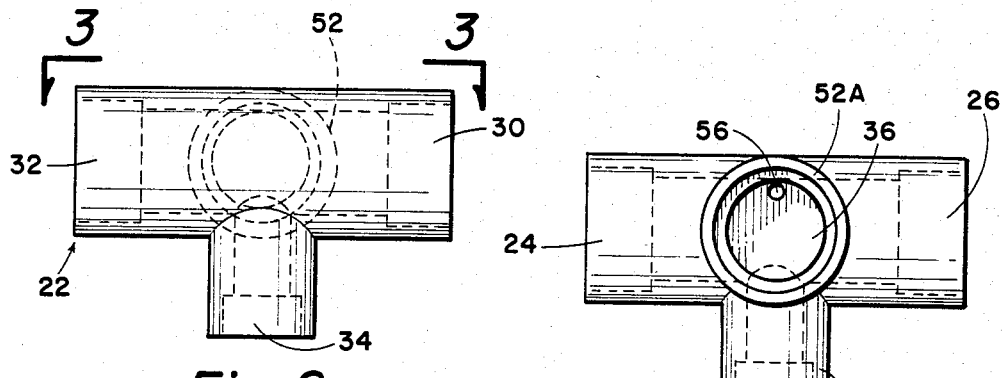
Fig. 2
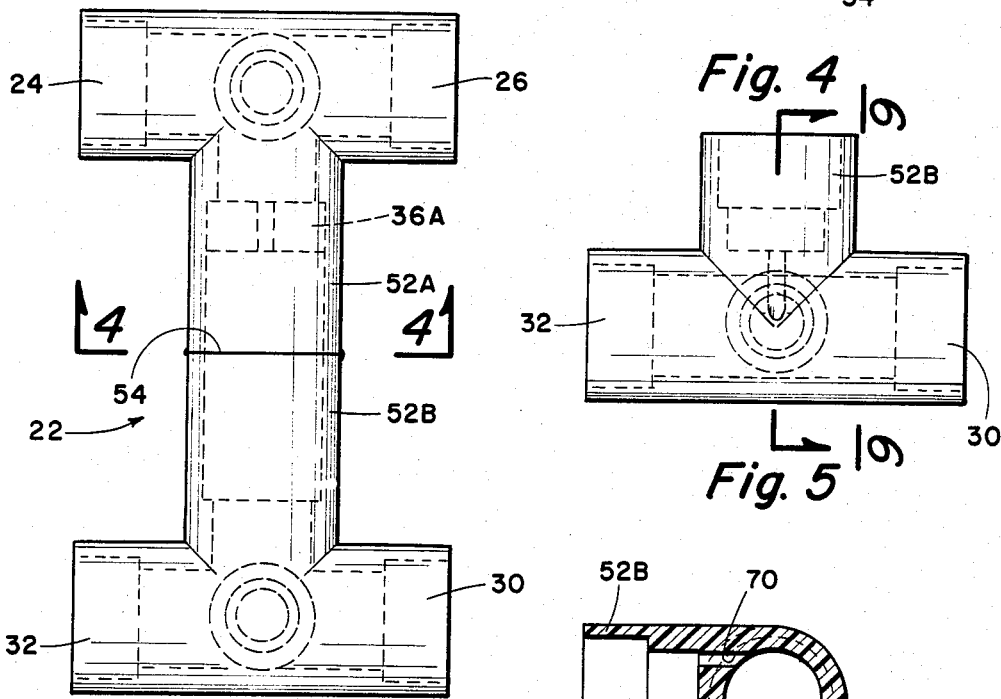
Fig. 3
Fig. 4
Fig. 5
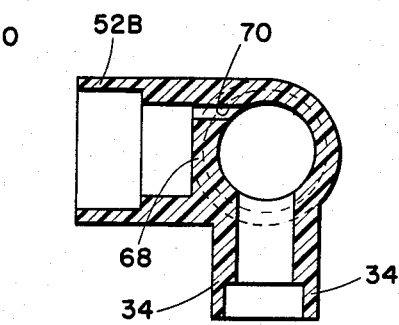
Fig. 6

DRILLED WELL SERIES AND PARALLELED HEAT EXCHANGE SYSTEMS

SUMMARY OF THE INVENTION

This invention relates to a system for use in exchanging heat energy with the earth. Within the first 200-feet of the earth's surface is a virtually untapped geothermal reservoir. This area is maintained at a relatively steady thermal state. In the Stillwater, Okla. area, as an example, this temperature is approximately 62° F. A heat pump can be used to extract heat from or inject heat into this moderate earth ambient source much more effectively and efficiently than transferring heat to ambient air which varies between 0° F. and 100° F.

The concept of utilizing geothermal energy from the earth by the use of heat pumps has been known, such as is employed when well water is used as a liquid to supply the geothermal source. Water from a well, in this system, is circulated through the heat pump and then discarded or returned to the ground. However, this method is very vulnerable to water supply related problems. A closed loop system, such as is utilized in the system of this invention overcomes these water supply problems.

Various closed loop geothermal heat exchange methods have been considered. Among these are systems which employ coils, tanks or other liquid containers buried in the earth at depths ranging from a few feet to several hundred feet. These systems suffer from deficiencies but have nevertheless been effective in tapping the earth heat source. These systems often include the ability to dispense liquid into the surrounding soil to enhance heat conductivity and system performance.

Other systems use wells bored into the earth. However, health departments require, usually demand, at the very least that the well bore be plugged. This is required with the express purpose of preventing contamination of the aquifiers with surface water. In addition, some systems stress the use of metallic materials to enhance heat transfer, ignoring the very slow heat transfer characteristics of the earth and the ravages of time on the metallic heat exchanger itself. In addition, most captured fluid heat transfer systems encounter airlock problems which interfere with their efficiency.

In the present invention a system is provided in which thermal energy is exchanged in a closed system with the earth, employing drilled wells. The drilled well boreholes are spaced apart from each other such as at least about ten-feet apart and preferably in a relatively straight line to simplify connections, although this is merely preferable and not mandatory. Positioned in each of the drilled well boreholes is an up pipe and a down pipe, which are preferably made of non-metallic flexible plastic material. The up and down pipes may be of a diameter such as 1½-inches. At the top of each borehole is a header which connects the fluid distribution system with the up and down pipes. The headers can be arranged for either series or parallel flow of fluid through the pipes extending into the boreholes.

In the embodiment of the system wherein the flow through the boreholes is in series, each header includes a supply inlet port, a supply outlet port, a down pipe port and an up pipe port. The supply port and down pipe port are in communication with each other and are separated by a partition in the header between the up pipe port and the supply outlet port. The partition includes means to permit the passage of air therethrough while restricting substantial flow of fluid. This is exceedingly important since it has been discovered that in attempting to exchange heat between a fluid medium and the earth's surface utilizing boreholes a serious problem is that of airlocking. Any air which exists in the closed system will tend to collect in the top of the borehole down pipes. When this occurs substantial efficiency is lost in moving the fluid through the system thereby reducing pump efficiency and the overall heat exchange efficiency of the system.

The other basic system as disclosed in this invention is the provision for parallel flow through the up and down pipes in each of the boreholes. The headers for the parallel system are different than that used in the series system. Each header for a parallel system includes a first supply port, a second supply port, a first return port, a second return port, a borehole inlet port and a borehole outlet port, that is, six openings which are connected to piping. The supply ports and down pipe ports are isolated from the return ports and up pipe ports by a partition wall which, as in the series connected system, has means to permit the flow of air through it so as to prevent airlock.

The systems of this invention thus provide an improved arrangement for exchanging thermal energy with the earth and a closed fluid medium in a way to maximize the efficiency of such transfer and decrease the potential of airlock.

Reference may be had to U.S. Pat. No. 4,257,239 entitled "Earth Coil Heating and Cooling System" issued Mar. 24, 1981 as an example of a means of employing energy transfer with the earth in a heat pump system. This patent illustrates one example of the way energy transfer with the earth is utilized and is an example of a heat pump application which could advantageously utilize the geothermal heat exchange systems of this disclosure.

The invention will be better and more completely understood by reference to the following description and claims, taken in conjunction with the attached drawings.

DESCRIPTION OF THE DRAWINGS

FIG. 2 is an end view of a header of the type employed in the parallel system of FIG. 1.

FIG. 3 is a bottom plan view of the parallel header as used in FIG. 1, taken along the line 3—3 of FIG. 2.

FIG. 4 is a cross-sectional view taken along the line 4—4 of FIG. 3.

FIG. 5 is a view of a fitting which may be employed in forming a header of the type shown in FIG. 3, showing an alternate arrangement for providing a vent for trapped air.

FIG. 6 is a cross-sectional view taken along the line 6—6 of FIG. 5.

DETAILED DESCRIPTION OF THE PREFERRED EMBODIMENT

Figure 1:
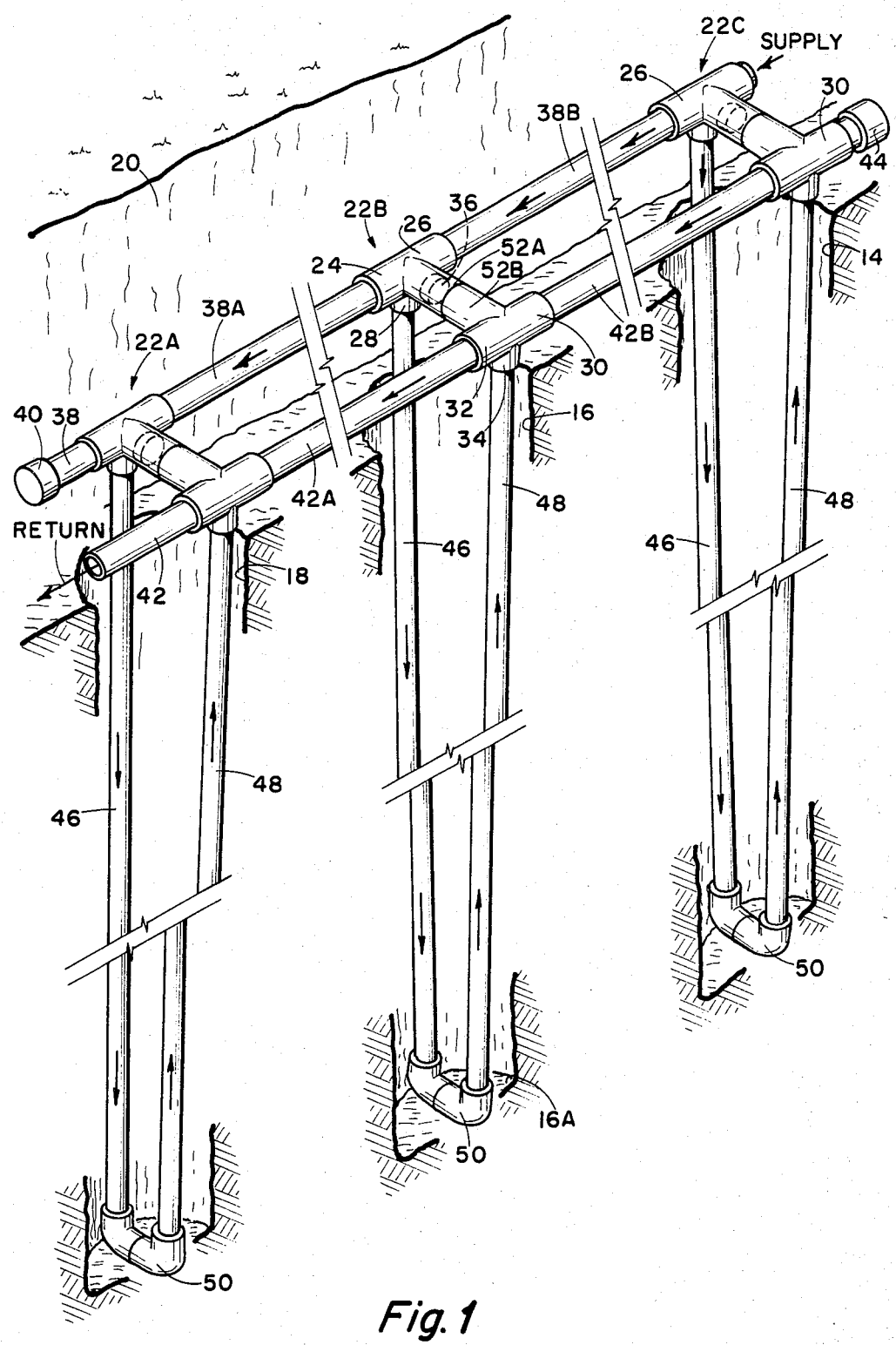
FIG. 1 is an isometric view of a system of this invention for exchanging the thermal energy of a closed fluid medium with the earth, employing a series of spaced apart boreholes and in which the fluid flows in a parallel system of conduits extending into the boreholes.
Figure 7:
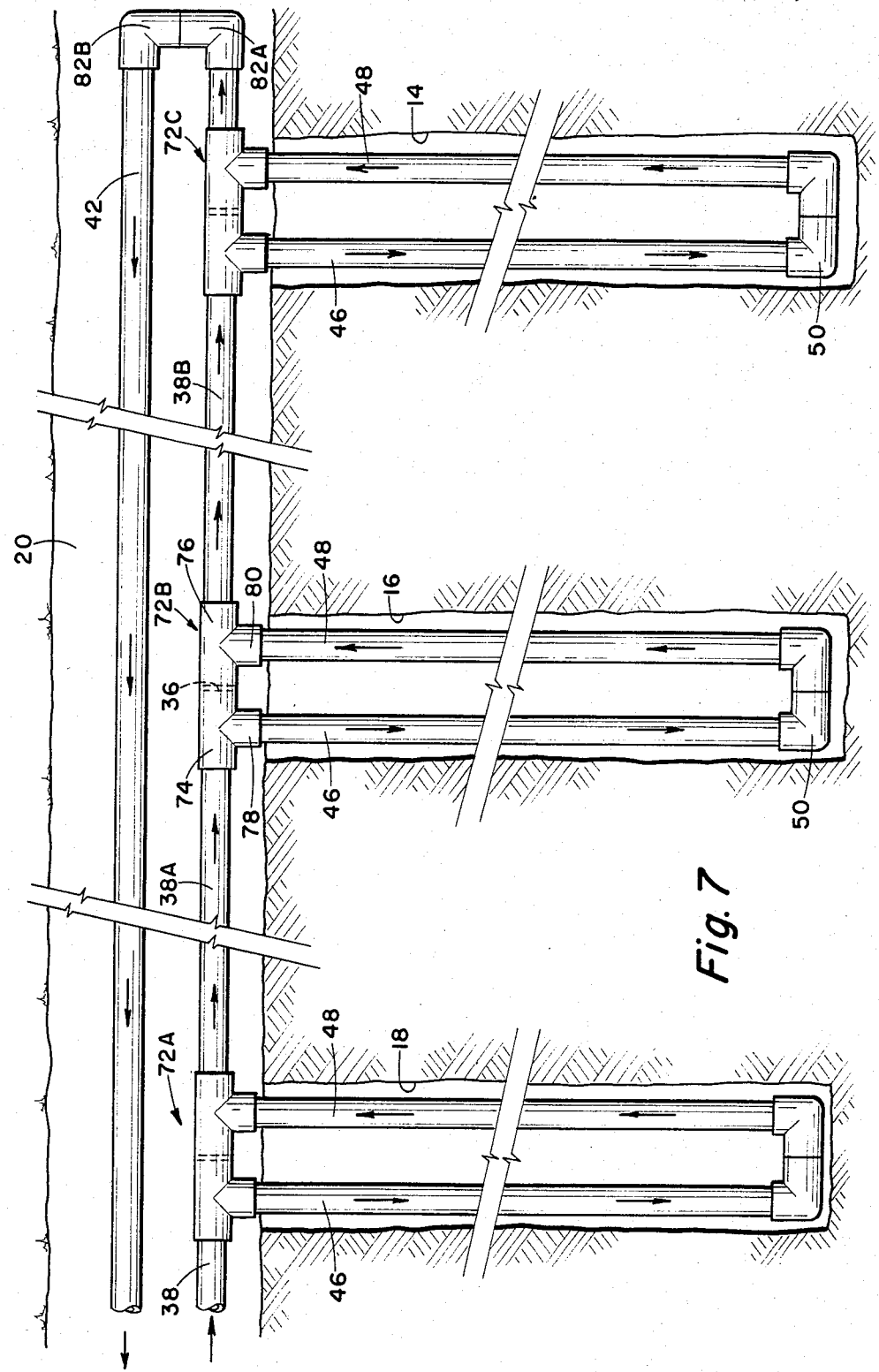
FIG. 7 is an elevational view of a heat exchange system in which fluid is conducted in series through a plurality of spaced apart boreholes.

Referring to the drawings, two basic systems are illustrated for exchanging heat between a fluid medium and the earth. FIG. 1 shows a system employing a group of drilled boreholes and a piping arrangement such that fluid is circulated in parallel paths in the boreholes for heat exchange. FIG. 7 shows a similar group of boreholes but in an arrangement wherein the fluid is circulated in a series arrangement. Each of these arrangements include a concept which has found to be extremely important; that is, means of preventing airlock, which will be described in detail subsequently.

Referring first to the arrangement of FIG. 1, a group of boreholes, three being illustrated, are indicated by the numerals 14, 16 and 18. These boreholes are drilled to a depth which will be predicated upon the amount of heat exchange necessary. In the typical application wherein heat exchange is desired for a heat pump for a residence, small office, industrial location or the like, the depth of each of the boreholes 14, 16 and 18 may be approximately 100-feet. The spacing between the boreholes may be any desired but is preferably at least 10-feet or so so as to make sure that full heat transfer in each borehole can be achieved without the adjacent borehole becoming a factor. The number of boreholes will depend on the amount of heat exchange required. While three boreholes are illustrated in both FIGS. 1 and 7 this is merely exemplary. The principles of the invention function for any arrangement of two or more boreholes.

The boreholes 14, 16 and 18 are preferably drilled in the bottom of a ditch 20 so that all of the piping can be run underground. This system has three advantages. First, increased heat exchange with the earth is obtained since the horizontal piping buried in ditch 20 functions to exchange heat with the earth. Second, the horizontal piping, and thereby the fluid in the piping, is less subject to ambient temperatures. Third, the piping is protected from physical damage.

Positioned above each borehole is a header, generally indicated by the numerals 22A, 22B and 22C. Each of the headers includes a first supply port 24, a second supply port 26, a borehole inlet 28, a first return port 30, a second return port 32, and a borehole outlet 34. The first supply port 24, second supply port 26 and borehole inlet 28 are all in open communication with each other. In like manner, the first return port 30, second return port 32 and first borehole outlet 34 are in common communication. A partition 36 divides the portions which are in open communication with each other. All of these features will be described in greater detail subsequently. The function of partition 36 is to separate the two portions of the header to prevent any substantial fluid flow therebetween but to permit the passage of air therethrough so to avoid airlock in the system.

A supply conduit 38 connects the closed heat exchange system with a remote apparatus which makes use of heat transfer with the fluid in the system. Typically such apparatus is a heat pump as used for providing heating or cooling to the interior of a building. The heat pump apparatus or other similar system includes a fluid circulation pump (not shown) to cause fluid to flow through supply conduit 38. The supply conduit includes portions 38A and 38B between headers 22A, 22B and 22C respectively. The second supply port 26 of header 22C is closed with a cap 40.

A return conduit 42 extends back to a heat pump or other apparatus which utilizes the thermal energy fluid conducted in the system. Return conduit 42A extends between header 22A, 22B and return conduit 42B between headers 22B and 22C. The second return port 30 of header 22C is closed by cap 44.

Referring to header 22B, a down pipe 46 connects with the borehole inlet 28 and extends downwardly to adjacent the bottom. A parallel up pipe 48 extends from adjacent the borehole bottom 16A and connects with the header borehole outlet 34. A U-coupling 50, which will be described in greater detail subsequently connects the lower ends of down pipe 46 and up pipe 48 adjacent the bottom 16A of the borehole. In like manner down pipes and up pipes are positioned in boreholes 14 and 18.

It can be seen that fluid flowing into the system through conduit 38 flows in a parallel arrangement, all of the fluid passing through one of the three sets of down pipes and up pipes. When the system is complete the boreholes 14, 16 and 18 are filled with earth so that the down pipes and up pipes are in intimate contact with the earth to achieve heat transfer.

While the piping necessary to practice the invention may be of metal, a highly preferred arrangement is the use of plastic pipe since it is not attacked by the earth, it is not subject to corrosion or galvanic action and has a more or less unlimited life expectancy when buried in the earth. The size of the pipes will depend on the volume of fluid flow but typically, for the average heat exchange systems for use with a heat pump, the down pipes and up pipes 46 and 48 may be of 1-inch diameter plastic. The supply conduit 38 and return conduit 42, and the portions connecting headers may be such as 1½-inch diameter plastic pipe.

Referring to FIGS. 2 through 6, details of the construction of the headers 22 are illustrated. The header as shown in FIG. 3 is formed of two portions, each portion of which has four cylindrical portions. The portions are joined together by butt fusion. Each half of the header includes a connecting portion 52. As shown in FIG. 3, the connecting portions 52A and 52B are butt fused at 54. The connecting portions 52A and 52B are closed by a partition 36 or 36A.

One of the important aspects of the invention is means of preventing airlock occurring in the system. With reference to FIG. 1, it can be seen that if a column of air builds up in one of the down pipes 46, or up pipes 48, a hydrostatic head will develop which will restrict fluid flow. In the parallel arrangement of FIG. 1 it is important that fluid flow volume be as equally as possible through the conduits in each of the boreholes. If a hydrostatic head due to an air column develops in either one of the boreholes then the quanity of fluid flowing through it will be substantially reduced, thereby reducing efficiency of the whole system. Further it can be seen that if all hydrostatic heads are eliminated the resistance to flow through the entire system will not be affected by small variation in the depth of the boreholes since the systems will always be in balance. On the other hand, if hydrostatic heads develop in any one of the up or down pipes then the entire efficiency of the system is jeopardized.

In order to alleviate the possibility of occurance of airlock within the system it is important that means be provided for the passage of air between the upper end of the up pipe 48 and down pipe 46. This is accomplished in each of the headers 22. As previously indicated, in the connecting portions 52A or 52B there is provided a partition 36. A prime function of the partition is to prevent the flow of fluid therepast and to insure that the fluid flows through the down pipes and up pipes; however, means needs to be provided so that any air which accumulates in the up pipe or down pipe can be vented. This is achieved by providing an air passageway through the partitions 36. For this purpose the partition may be in the form of a disc as seen in FIG. 4, may be a cylindrical member of relatively short length which can be fitted within the connecting portion 52A or or 52B. The disc partition has a small weep hole 56 through it. This weep hole allows air to pass through. It will, of course, allow fluid also to pass through but the quantity of fluid which will pass through the weep hole is negligible compared to the total volume of fluid being circulated. While the passage of fluid through the weep hole 36 results in some small decrease in the overall efficiency of the system, the advantages gained by the elimination of potential hydrostatic heads are so great as to justify a slight decrease in efficiency.

Figure 12:
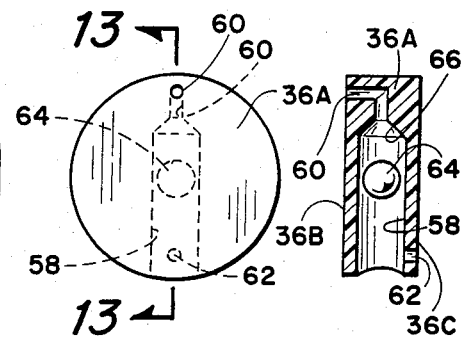
FIG. 12 is an end view of a disc which may be utilized with the fitting of the type shown in FIGS. 10 and 11 for venting air to prevent airlock in the system.
Figure 13:
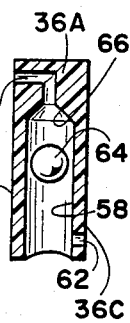
FIG. 13 is a cross-sectional view taken along the line 13—13 of FIG. 12 showing more details of the airlock preventing disc.

An alternate arrangement for the disc is shown in FIGS. 12 and 13. The disc 36A is cylindrical and of short length as previously described but it has an elongated recess 58 which communicates with the cylindrical edge of the disc. The recess 58 is connected by a small diameter passageway 60 with one surface 36B of the disc; a second small diameter passageway 62 connects the recess 58 with the other surface 36C of the disc. The small diameter passageways 60 and 62 are adjacent the periphery of the disc and diametrically opposed to each other. Within the recess 58 is a ball 64 which is of specific gravity so that it is floated by the fluid in the system. When the system is filled with fluid the ball floats upwardly against the upper end of the recess which tapers to the passageway 60, the tapered portion forming a seat 66. When the ball 64 is floated against seat 66 the passage of fluid through passageway 60 is terminated. On the other hand, if an air column exists within the system the ball 64 is not floated and air is free to pass through passageway 62, recess 58 and passageway 60 so as to move past the partition 36A.

An alternate means of providing a header which achieves the elimination of airlocks is shown in FIGS. 5 and 6. In this arrangement the fitting is provided with an integral internal wall 68 which separates the connecting portion 52B from the other ports of the fitting. A small weep hole 70 is located in the integral wall 68 to let air pass through. Thus the integral wall 68 forms the same purpose as the partition 36.

Refer now to FIG. 7. As previously indicated this is a system which conducts fluid flow in series rather than in parallel as in FIG. 1. The spaced apart boreholes 14, 16 and 18 are drilled in the bottom of the ditch 20 and receive up pipes 48 and down pipes 46, the pipes being connected at the bottom with the U-couplings 50, all as previously described. Mounted above each of the boreholes is a header 72 designated as 72A, 72B and 72C. Each of the headers has a supply inlet port 74, an outlet port 76, a borehole inlet 78 and a borehole outlet 80. The supply port 74 and outlet port 76 are in co-axial relationship whereas the borehole inlet and outlet ports 78, 80 are spaced apart and parallel each other and receive the down and up pipes 46 and 48 respectively. The supply inlet port 74 and borehole inlet 78 are in open communication with each other and, in like manner, the outlet port 76 and the borehole outlet port 80 are in communication with each other, with a partition 36 separating these two sets of openings.

The supply conduit 38, conducts fluid from a unit, such as a heat pump, having a fluid pump as a part thereof. The fluid flows first through the first half of header 72A, through the down pipe 46 and up pipe 48 in borehole 18 and through the last half of header 72A and then through conduit 38A to header 72B. The fluid is conducted in like manner through the conduits extending into each of the boreholes 16 and 14. After the fluid passes out of the up pipe in the last borehole 14 it enters the return conduit 42 such as by the use of two butt fused L-fittings 82A and 82B.

Figure 8:
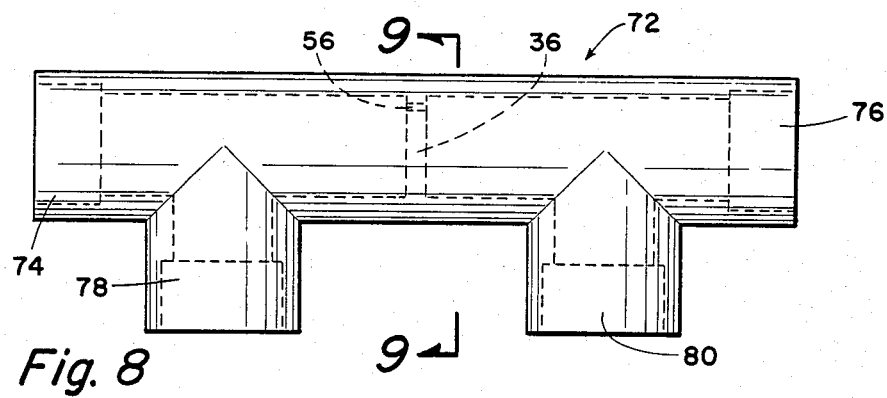
FIG. 8 is an elevational side view of a header as employed in the series arrangement of FIG. 7 and showing one type of vent means for preventing airlock.
Figure 9:
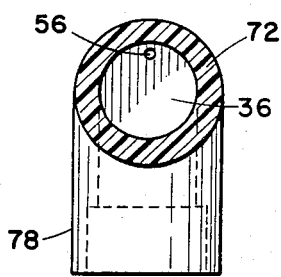
FIG. 9 is a cross-sectional view taken along the line 9—9 of FIG. 8 showing a type of air vent.

Referring to FIGS. 8 and 9, an embodiment of a header 72 is shown in elevational view. In the illustrated arrangement of FIG. 8 the head is an integral apparatus cast or otherwise formed of plastic material having an integral wall or partition 36. The partition 36 has a weep hole 56 permitting the passage of trapped air.

Figure 10:
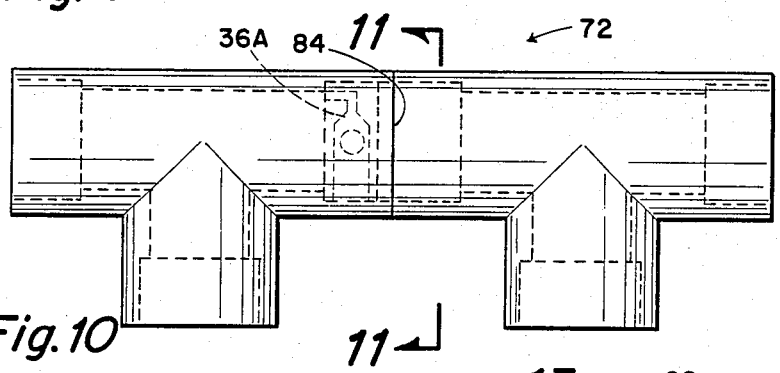
FIG. 10 is an elevational side view of a header as employed in FIG. 7 which is of an alternate design, including an alternate type of vent for preventing airlock.
Figure 11:
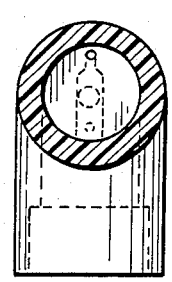
FIG. 11 is a cross-sectional view taken along the line 11—11 of FIG. 10.

FIGS. 10 and 11 show an alternate arrangement of the header 72 formed of two integral portions which are butt fused at 84. Positioned within the end of one of the portions prior to butt fusion is a partition 36A of the type illustrated in FIGS. 12 and 13 which permits the passage of air but does not permit the passage of fluid.

In both the arrangements of FIGS. 1 and 7 the lower ends of the borehole down pipes and up pipes 46, 48 are closed by U-couplings 50. These may be formed of L-couplings which are butt fused to each other, or the U-couplings may integrally formed.

Each of the systems of FIG. 1 and 7 have advantages and disadvantages. The series arrangement of FIG. 7 has the advantage that the same quantity of fluid is certain to pass through the pipes in each of the boreholes since they are in series. However, it has the disadvantage that as heat is exchanged between the earth and the fluid flowing through the system the temperature of the fluid approaches that of the earth so that in each succeeding borehole there is a reduced temperature differential, and therefore a reduced rate of heat exchange. The parallel arrangement of FIG. 1 has the advantage that the fluid passes through the pipes in a borehole only once and therefore the same temperature differential exists in the fluid in each borehole. However, since the systems of FIG. 1 are in parallel arrangement there is no mathematical certainty that the same quantity of fluid flows through the conduits in each borehole. Therefore in the system of FIG. 1 care must be exercised to make sure that the piping is installed in such a way that the pressure drop in each borehole is the same so that equal flow rates will be achieved in each borehole for maximum heat transfer effectiveness.

The present invention allows effective heat transfer between a closed fluid circulation system employing a number of boreholes. By using a plurality of spaced apart boreholes, the boreholes need not be as deep as if only a single borehole is employed, thereby having advantage in reducing the costs of drilling, particularly in terrains wherein drilling becomes substantially more difficult at greater depths. In addition, by having a series of shallow depth boreholes it is not necessary to suspend great lengths of pipe during the installation of the system.

A serious effort has been made to describe the invention by reference to the preferred embodiments, however it is understood that the invention is not to limited to the illustrations herein but is to be limited only by the scope of the attached claim or claims, including the full range of equivalency to which each element thereof is entitled.

What is claimed is:

1. A system for exchanging thermal energy between a fluid medium and the earth comprising:
   a plurality of boreholes drilled in the earth at spaced apart but adjacent locations;
   a header positioned above each borehole, each header having a supply inlet, a return outlet, a borehole inlet and a borehole outlet, said supply inlet communicating with said borehole inlet and said return outlet communicating with said borehole outlet, a partition within said header separating said supply inlet from said return outlet, said partition having means for the passage of air while at least substantially prohibiting the passage of fluid therepast;
   a down pipe connected at its upper end to said borehole outlet of each said header and extending into said borehole therebelow;
   an up pipe connected at its upper end to said header borehole inlet and extending into said borehole therebelow, the lower end of said down pipe and up pipe being connected to each other adjacent the borehole bottom; and
   conduit means connecting said supply inlets and return outlets of said headers for conveyance of fluid through said down pipes and up pipes for transfer of thermal energy of fluid with the earth surrounding said boreholes.

2. A system for exchanging thermal energy between a fluid medium and the earth according to claim 1 wherein said means with said partition of each said header of passing air while at least substantially prohibiting, the passage of fluid therepast includes a small weep hole in said partition.

3. A system for exchanging thermal energy between a fluid medium and the earth according to claim 1 wherein said partition of each said header has a flow passageway therethrough and including valve means permitting the passage of air therethrough and restricting the passage of water therethrough.

4. A system according to claim 3 wherein said flow passageway is, at least in part, vertically oriented and such vertical portion is defined in part by a valve seat, and including a closure member with said passageway below said valve seat having specific gravity, less than said fluid medium, whereby said valve member moves downwardly from said seat to permit the flow of air therethrough but is floated upwardly in the presence of fluid to close against said valve seat.

5. A system for exchanging thermal energy between a fluid medium and the earth comprising:
   a plurality of boreholes drilled in the earth at spaced apart but adjacent locations;
   a header positioned above each borehole, each header having a first supply port, a second supply port, a first return port, a second return port, a borehole inlet port and a borehole outlet port, said supply ports and said borehole inlet port being in open communication with each other, and said return ports and said borehole outlet port being in open communication with each other, and the header having a partition between said supply ports and said return ports, said partition having means to permit the flow of air therepast but preventing substantial fluid flow therepast;
   first conduits connecting the supply ports of adjacent headers to each other and second conduits connecting return ports of adjacent headers to each other;
   a down pipe connected to the said borehole inlet port of each header and extending into the said borehole below each header;
   an up pipe connected to the said borehole outlet port of each header and extending into the said borehole below each header; and
   means adjacent the lower end of each said borehole to connect the lower end of each said down pipe and said up pipe, whereby fluid introduced in said first conduits flows into said down pipe and through said up pipe to said second conduits in parallel flow paths to exchange heat of the fluid with the earth.

6. A system for exchanging thermal energy between a fluid medium and the earth according to claim 5 wherein said means with said partition of each said header of passing air while at least substantially prohibiting the passage of fluid therepast includes a small weep hole in said partition.

7. A system for exchanging thermal energy between a fluid medium and the earth according to claim 5 wherein said partition of each said header has a flow passageway therethrough and including valve means permitting the passage of air therethrough and closing to restrict the passage of water therethrough.

8. A system according to claim 7 wherein said flow passageway is, at least in part vertically oriented and such vertical portion is defined in part by a valve seat, and including a closure member within said passageway below said valve seat having specific gravity less than said fluid medium, whereby said valve member moves downwardly from said seat to permit the flow of air therethrough but is floated upwardly in the presence of fluid to close against said valve seat.

9. A system for exchanging thermal energy between a fluid medium and the earth comprising:
   a plurality of elongated openings in the earth at spaced apart but adjacent locations;
   a header positioned at each elongated opening, each header having a supply inlet, a return outlet, an exchange pipe inlet and an exchange pipe outlet, said supply inlet communicating with said exchange pipe inlet and said return outlet communicating with said exchange pipe outlet, a partition within said header separating said supply inlet from said return outlet, said partition having means for the passage of air while at least substantially prohibiting the passage of fluid therepast;

a first exchange pipe connected at its first end to said exchange pipe outlet of each said header and extending into said earth elongated opening;

a second exchange pipe connected at its first end to said exchange pipe inlet of each said header and extending into said earth elongated opening, the second end of said first exchange pipe and the second end of second exchange pipe being connected to each other in said earth elongated opening at a point spaced from said header; and conduit means connecting said supply inlets and return outlets of said headers for conveyance of fluid through said first and second exchange pipes in each of said elongated openings for transfer of thermal energy of fluid with the earth surrounding said earth elongated openings.

10. A system for exchanging thermal energy between a fluid medium and the earth according to claim 9 wherein said means with said partition of each said header of passing air while at least substantially prohibiting the passage of fluid therepast includes a small weep hole in said partition.

11. A system for exchanging thermal energy between a fluid medium and the earth according to claim 9 wherein said partition of each said header has a flow passageway therethrough and including valve means permitting the passage of air therethrough and restricting the passage of water therethrough.

12. A system according to claim 11 wherein said flow passageway is, at least in part, vertically oriented and such vertical portion is defined in part by a valve seat, and including a closure member with said passageway below said valve seat having specific gravity less than said fluid medium, whereby said valve member moves downwardly from said seat to permit the flow of air therethrough but is floated upwardly in the presence of fluid to close against said valve seat.

13. A system for exchanging thermal energy between a fluid medium and the earth comprising:

a plurality of elongated openings in the earth at spaced apart but adjacent locations;

a header positioned at each elongated opening, each header having a first supply port, a second supply port, a first return port, a second return port, an exchange pipe inlet port and an exchange pipe outlet port, said supply ports and said exchange pipe inlet port being in open communication with each other, and said return ports and said exchange pipe outlet port being in open communication with each other, and the header having a partition between said supply ports and said return ports, said partition having means to permit the flow of air therepast but preventing substantial fluid flow therepast;

first conduits connecting the supply ports of adjacent headers to each other and second conduits connecting return ports of adjacent headers to each other;

a first exchange pipe connected to the said exchange pipe inlet port of each header and extending into the said elongated opening in the earth at which the header is positioned;

a second exchange pipe connected to the said exchange pipe outlet port of each header and extending into the said elongated opening in the earth at which the header is positioned; and means at the second ends of said first and second exchange pipes to connect them together whereby fluid introduced into said first conduits flows into said first exchange pipes and through said second exchange pipes to said second conduits in parallel flow paths to exchange heat of the fluid with the earth.

14. A system for exchanging thermal energy between a fluid medium and the earth according to claim 13 wherein said means with said partition of each said header of passing air while at least substantially prohibiting the passage of fluid therepast includes a small weep hole in said partition.

15. A system for exchanging thermal energy between a fluid medium and the earth according to claim 13 wherein said partition of each said header has a flow passageway therethrough and including valve means permitting the passage of air therethrough and closing to restrict the passage of water therethrough.

16. A system according to claim 15 wherein said flow passageway is, at least in part vertically oriented and such vertical portion is defined in part by a valve seat, and including a closure member within said passageway below said valve seat having specific gravity less than said fluid medium, whereby said valve member moves downwardly from said seat to permit the flow of air therethrough but is floated upwardly in the presence of fluid to close against said valve seat.

* * * * *